June 5, 1923.

1,458,086

I. L. THIEL

CHAIN HOOK

Filed July 1, 1922

I. L. Thiel
INVENTOR

BY Victor J. Evans
ATTORNEY

WITNESS:

Patented June 5, 1923.

1,458,086

UNITED STATES PATENT OFFICE.

IGNATIUS L. THIEL, OF DERRICK CITY, PENNSYLVANIA.

CHAIN HOOK.

Application filed July 1, 1922. Serial No. 572,143.

*To all whom it may concern:*

Be it known that I, IGNATIUS L. THIEL, a citizen of the United States, residing at Derrick City, in the county of McKean and State of Pennsylvania, have invented new and useful Improvements in Chain Hooks, of which the following is a specification.

This invention relates to coupling devices or connectors, especially adapted for connecting the ends of automobile tire chains.

An object of the present invention is the provision of a device of the above character which will effectually hold a chain in position and which may be easily manipulated to fasten or unfasten a chain.

Another object of the invention is the provision of means whereby adjustment may be made to regulate the length of the chain, so that the latter will accurately fit a tire.

With the above and other objects in view, the invention further includes the following novel features and details of construction, to be hereinafter more fully described, illustrated in the accompanying drawings and pointed out in the appended claims.

In the drawings:—

Figure 1:
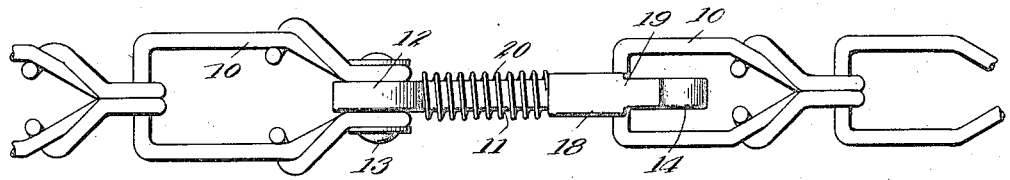
Figure 1 is a plan view showing a fragmentary portion of a tire chain with the invention applied.
Figure 2:
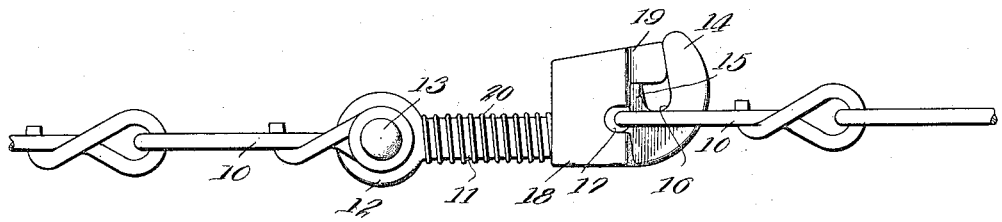
Figure 2 is a side view of the same.
Figure 3:
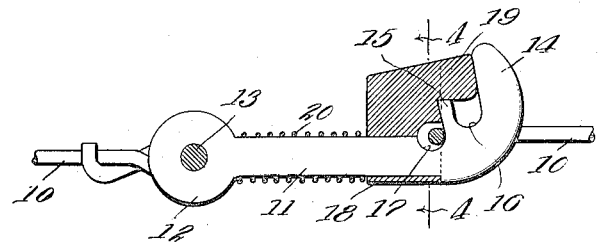
Figure 3 is a longitudinal sectional view.
Figure 4:
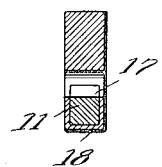
Figure 4 is a transverse section.

Referring in detail to the drawings, wherein like characters of reference denote corresponding parts, the reference character 10 indicates the opposite ends of one of the side chains of a non-skid chain for automobile tires, which may be of any desired make.

For the purpose of connecting the ends 10 of these side chains, the present invention provides a coupling or connecting hook which includes a shank 11, having one end provided with an eye 12 for pivotal engagement with one end 10 of the chain, a stud 13 passing through the eye 12 for this purpose.

The opposite end of the shank is provided with a rigid jaw 14, which extends from the extremity of the shank and which has spaced therefrom a tongue 15, the space between this tongue and jaw providing a seat 16 for the reception of the link which forms the other end 10 of the side chain. The jaw is provided with an additional seat 17 which is located at the juncture of the jaw and shank 11 and which is spaced from the seat 16 by the tongue 15 and as this seat 17 is also designed to receive the link 10, the length of the side chains may be regulated so that the latter will properly fit a tire.

Mounted for sliding movement upon the shank 11 is a sleeve 18 and extending from this sleeve is a jaw 19, which is movable with respect to the jaw 14. The jaw 19 extends over and closes the seats 16 and 17 and when in closed position will prevent accidental removal of the link from either of the seats.

Surrounding the shank 11 and having one end bearing against the eye 12 and its opposite end bearing against the end of the sleeve 18, is a spring 20. This spring acts to yieldingly hold the movable jaw into engagement with the rigid jaw so as to prevent accidental disengagement of the end 10 of the chain, but permits of a free sliding movement of the jaw 19 when it is desired to open the same for the purpose of adjusting or removing the chain. In addition, the spring 20 acts to automatically close the jaws, so that the latter will not be inadvertently left open.

A tire chain to which the invention is attached, may be put on a tire with the hooks either in front or behind, as the hook cannot become unfastened due to slack in the side chains.

The invention is susceptible of various changes in its form, proportions and minor details of construction and the right is herein reserved to make such changes as properly fall within the scope of the appended claims.

Having described the invention what is claimed is:—

1. A chain hook comprising a shank adapted to have one end secured to one end of a chain, a rigid jaw formed on the opposite end of the shank, spaced link receiving seats provided in the rigid jaw and a spring actuated jaw slidingly mounted upon the shank for preventing accidental removal of the link from either seat.

2. A chain hook comprising a shank adapted to have one end secured to one end of a chain, a rigid jaw formed on the opposite end of the shank, a spaced tongue extending from the rigid jaw and providing a link receiving seat, a second link receiving seat spaced from the first mentioned seat, a spring actuated sleeve slidingly mounted upon the shank and a jaw carried by the sleeve and extending over the seats for preventing accidental removal of the link from either of the seats.

In testimony whereof I affix my signature.

IGNATIUS L. THIEL.